Jan. 6, 1925.
D. D. KLEIN
HYPODERMIC SYRINGE
Filed May 3, 1921
1,521,890
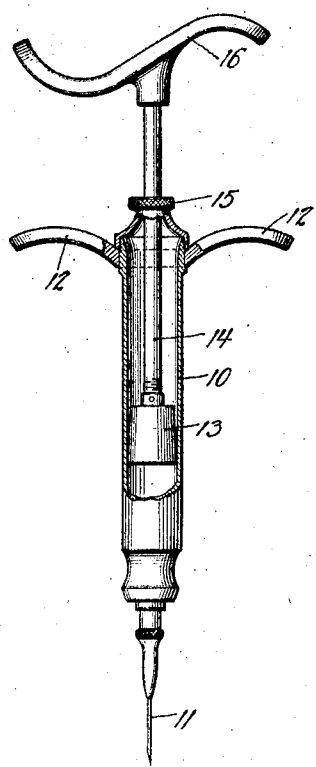
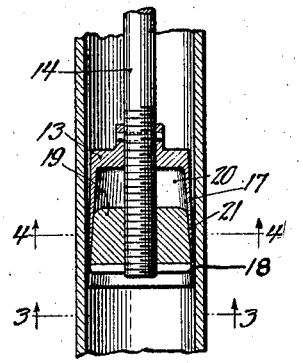
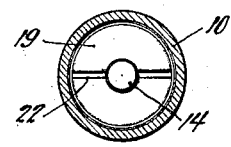
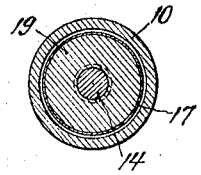
Inventor.
Daniel D. Klein.
By: Alfred R. Fuchs Atty.

Patented Jan. 6, 1925.

1,521,890

UNITED STATES PATENT OFFICE.

DANIEL D. KLEIN, OF CHICAGO, ILLINOIS.

HYPODERMIC SYRINGE.

Application filed May 6, 1921. Serial No. 467,387.

*To all whom it may concern:*

Be it known that I, DANIEL D. KLEIN, a citizen of the United States, residing at Chicago, in the county of Cook and State of Illinois, have invented certain new and useful Improvements in Hypodermic Syringes, of which the following is a specification.

This invention relates to hypodermic syringes and more particularly to a syringe of this nature that is provided with a metallic piston or plunger and which has no packing of a non-metallic or fibrous character.

It is a purpose of the present invention to provide a syringe or other member having a constricted orifice, with a piston for forcing a fluid through said orifice that is so constructed that there will be substantially no leakage of said fluid back of the piston, and so that there will be no clogging of the orifice or constricted opening thereof.

In hypodermic syringes and similar devices provided with needle-like discharge tubes having unusually constricted openings therethrough, the difficulty has arisen, when a fibre or rubber packing has been used for obtaining a fluid tight fit between the piston and the walls of the syringe, that the discharge openings of said syringes very frequently become clogged due to the passage of particles of said packing into said tube, wherein they remain lodged due to the small diameter thereof.

It is a purpose of the present invention to provide means for obtaining a substantially fluid-tight fit between a piston and the cylinder of a syringe or other device having a very constricted discharge opening, with the use of only metallic parts, so as to avoid clogging of said openings.

It is a further purpose of the invention to provide a piston in a device of the above mentioned character with a metallic ring-like member having a thinned flexible edge portion adapted to engage the adjacent wall of the cylinder to provide a fluid tight fit between said piston and cylinder.

It is another object of the invention to provide means for forcing a ring-like portion of the above mentioned character into snug engagement with said cylinder. If desired said ring-like member can be made a part of the piston itself, or if preferred, said member may be made in the form of a packing ring separable from said piston.

Other objects and advantages of the invention will appear as the description of the accompanying drawings proceeds. However, I desire to have it distinctly understood that I do not intend to limit myself to the exact details shown or described, but that I intend to include as a part of my invention all such obvious changes and modifications of parts as would occur to a person skilled in this art, and as would fall within the scope of the claim.

In the drawings:

Fig. 1 is a view partly in elevation and partly in longitudinal section of my improved syringe, Fig. 2 is an enlarged fragmentary longitudinal section thereof, Fig. 3 is a section taken on line 3—3 of Fig. 2, and Fig. 4 is a section taken on line 4—4 of Fig. 2.

Referring in detail to the drawings, in Figs. 1 to 4 inclusive is shown a hypodermic syringe comprising the tubular container or cylinder 10, having a needle-like nozzle member 11 secured thereto and communicating with the interior thereof. The cylinder 10 is provided with the usual finger holds 12 and operating within the same is a piston or plunger 13, adjustably screw threadedly secured to a piston rod 14 passing through the cap 15 on the cylinder 10. The piston rod 14 is provided with a handle 16 which is used for operating the syringe in the usual manner.

It is particularly difficult to obtain a satisfactory fluid-tight fit between a cylinder and piston operating therein for devices of the character described above without the use of fibrous or rubber packing. Where such a non-metallic packing is used the difficulty arises that particles thereof come loose and lodge in the constricted needle-like discharge opening, clogging the same so as to prevent operation of the syringe.

In the present device this difficulty is overcome by providing the piston 13 with a gradually tapering circular wall portion 17 terminating in a thin flexible metallic edge portion 18. The thinned metallic edge portion 18 is forced into snug engagement with the cylinder wall by means of the block 19 mounted in the hollow 20 of the piston 13. It will be noted that the block 19 is frusto-conical in shape and that the inclined wall 21 thereof engages with the flaring inner wall of the portion 17, and that the lock 19 has screw threaded engagement with the piston rod 14, whereby the block can be screwed upon the rod to wedge the thinned edges 18 outwardly into engagement with the inner wall of the cylinder, thus providing a fluid-tight fit between the piston 13 and cylinder 10. The wedge block 19 can be provided with a transverse cut or groove 22 for receiving a screw driver for tightening up the block if desired.

Having thus described my invention, what I desire to claim and secure by U. S. Letters Patent is:

In a hypodermic syringe, a metallic piston comprising an open-ended hollow member having a wall portion gradually tapering toward the open end thereof to provide a thinned flexible free edge portion for said piston, said piston having a bore therein gradually diminishing in diameter from the open end thereof, an expanding member having a wedging face thereon mounted in said piston and means for forcing said member into the bore of said piston to expand the same into engagement with said cylinder wall at the flexible edge thereof, with said free edge portion extending outwardly beyond said expanding member, for all positions of said expanding member.

In witness whereof, I hereunto subscribe my name this 2nd day of May A. D., 1921.

Dr. DANIEL D. KLEIN.